United States Patent [19]
Moller

[11] Patent Number: 5,149,440
[45] Date of Patent: Sep. 22, 1992

[54] EMULSION RESOLUTION

[75] Inventor: James W. Moller, Houston, Tex.

[73] Assignee: Bird Environmental Systems & Services, Inc., Norwood, Mass.

[21] Appl. No.: 558,146

[22] Filed: Jul. 26, 1990

[51] Int. Cl.[5] .......................................... B01D 17/05
[52] U.S. Cl. ............................. 210/708; 210/737; 210/738; 252/348
[58] Field of Search ............... 210/708, 709, 712, 716, 210/723, 724, 737, 738, 908; 252/330, 348

[56] References Cited

U.S. PATENT DOCUMENTS

| | | | |
|---|---|---|---|
| 4,765,910 | 8/1988 | Wolf | 210/708 |
| 4,797,214 | 1/1989 | Sevier | 210/708 |
| 4,961,858 | 10/1990 | Spei et al. | 210/709 |

OTHER PUBLICATIONS

Robinson, *The Mechanism of Detergent Action*, pp. 136–151, 1937.
Aiken and Palmer, *The Effect of Electrolytes on the Surface Activity of Solutions of Paraffin Chain Salts*, pp. 116–120, 1943.
Hahn and Vold, "The Kinetics and Mechanism of Ultracentrifugal Demulsification", *J. Colloid Interface S.*, 51:133, 1975.

*Primary Examiner*—Thomas Wyse

[57] ABSTRACT

An apparatus and method for resolving an emulsion that has an aqueous phase and an organic phase that includes components capable of polymerizing or coagulating. The emulsion is added to a tank and heated (with gentle agitation to avoid formation of hot spots) to a temperature sufficient to prevent it from setting up inside the tank. A non-corrosive inorganic separation aid incapable of initiating polymerization of the emulsion or its constituents is added to the tank with mixing to cause the emulsion to separate into its constituent aqueous and organic phases. The contents of the tank are then allowed to settle and the separated aqueous and organic phases are removed from the tank.

15 Claims, 1 Drawing Sheet

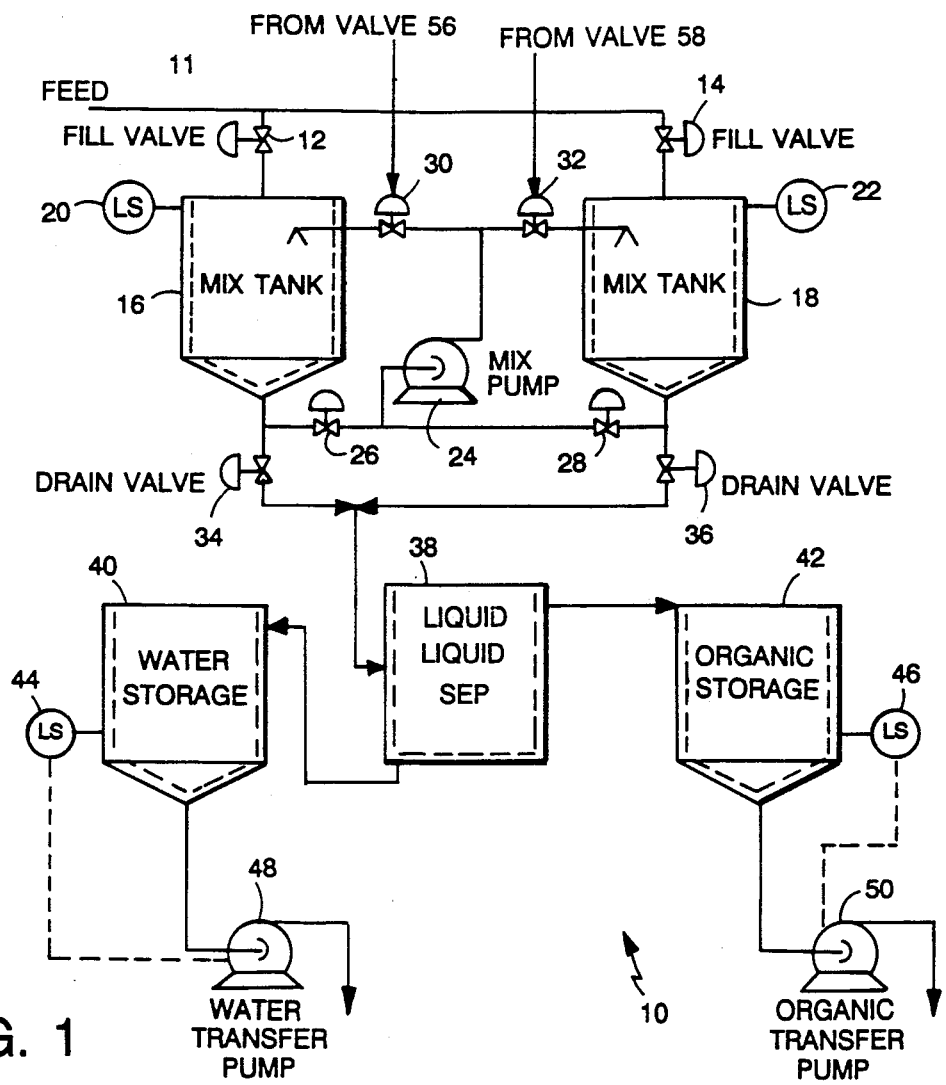
FIG. 1
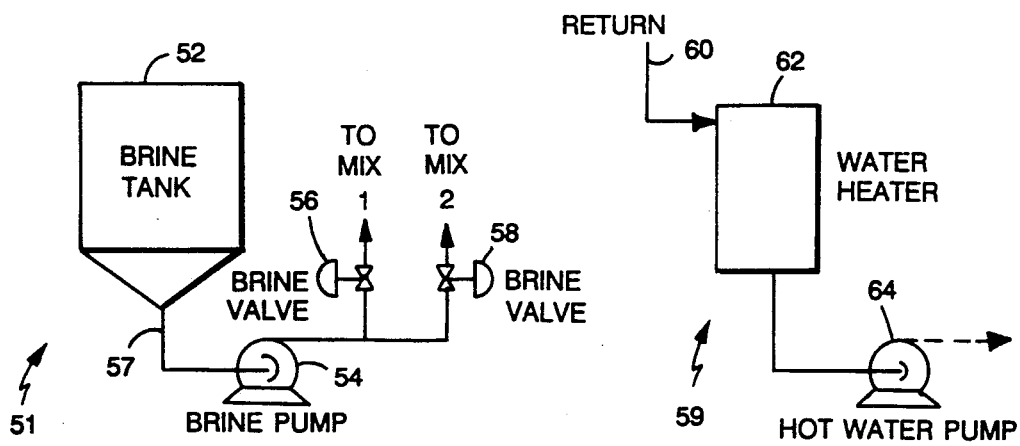
FIG. 2
FIG. 3

EMULSION RESOLUTION

BACKGROUND OF THE INVENTION

This invention relates to resolving emulsions.

During the synthesis, polymerization, or manufacture of thermoplastic and thermosetting polymers and resins (e.g., acrylonitrile-butadiene-styrene copolymer, polystyrene, polyvinyl chloride, polyester, phenolics, polyglycols, polyacrylonitriles, and polyacrylamides), and later during the forming, extruding, and shaping of these materials, various vapors consisting of gasified short chain polymers, decomposition products, and water are formed. These vapors are generally vented away from the work area due to their hazardous and irritating properties. Historically, these vapors have either been vented to the atmosphere, which causes pollution, or condensed and incinerated, which is very expensive and results in the loss of a natural resource. Often, these vapors condense to form an emulsion which can be hazardous. Due to its high monomer content, this emulsion can polymerize when it is heated excessively, mixed at high shear rates, or subjected to low pH. When it polymerizes, the emulsion solidifies or becomes gummy, causing equipment blockage or breakage.

SUMMARY OF THE INVENTION

In general, the invention features a method and apparatus for resolving an emulsion that includes an aqueous phase and an organic phase that includes components capable of polymerizing or coagulating (i.e., physically aggregating to form a larger mass). The method includes the steps of:

(a) introducing the emulsion into a tank;
(b) heating the emulsion at a temperature sufficient to prevent it from setting up (i.e., forming a solid or semi-solid gel) inside the tank while gently agitating the emulsion to avoid formation of hot spots (i.e., localized areas where the temperature is excessive);
(c) adding a non-corrosive inorganic separation aid incapable of initiating polymerization of the emulsion or its constituents (i.e., the compounds making up the aqueous and organic phases) to the tank with mixing to cause the emulsion to separate into its constituent aqueous and organic phases;
(d) allowing the contents of the tank to settle once separation aid addition is complete; and
(e) removing the separated aqueous and organic phases from the tank.

By "non-corrosive" it is meant that unlike reagents such as mineral acids, the separation aid does not chemically attack the emulsion separation apparatus.

In preferred embodiments, the emulsion includes a by-product from the processing of thermoset polymers or resins (i.e., materials which crosslink upon application of heat to become infusible and insoluble, e.g., phenolic resins) or thermoplastic polymers or resins (i.e., materials which flow upon application of heat, rather than crosslinking, e.g., acrylonitrile-butadiene-styrene, polystyrene, or polyvinyl chloride). The process is particularly useful with emulsions containing styrene.

To prevent the emulsion from setting up within the tank, the tank is preferably heated to a temperature of at least 120° F. but no greater than the boiling point of water (e.g., about 160° F.). Removal of the separated aqueous and organic phases is preferably carried out in a low turbulence liquid-liquid separator heated to the same temperatures.

The preferred separation aid is a saturated brine solution. During addition of the separation aid, the contents of the tank are preferably mixed by recirculating them through the tank (e.g., from the bottom of the tank to the top); preferably, the separation aid is added to the recirculating material during recirculation. The total amount of separation aid added is preferably between 4 and 8% by volume.

Apparatus for treating the above-described emulsions includes:

(a) a tank for holding the emulsion;
(b) a heater adapted to heat the contents of the tank to prevent the emulsion from setting up;
(c) separation aid addition apparatus adapted to add to the tank a predetermined (based upon total tank content) amount of a non-corrosive inorganic separation aid incapable of initiating the polymerization of the emulsion or its constituents to cause the emulsion to separate into its constituent aqueous and organic phases;
(d) mixing apparatus for gently agitating the emulsion prior to addition of the separation aid to avoid formation of hot spots and for mixing the contents of the tank during addition of said separation aid; and
(e) apparatus in communication with the tank adapted to remove the separated organic and aqueous phases from the tank.

The preferred apparatus for removing the separated organic and aqueous phases is a heated low turbulence liquid-liquid separator. The preferred separation aid is a saturated brine solution and the separation aid addition apparatus preferably includes a tank for storing the brine solution and a transfer pump for supplying the brine from this tank to the tank containing the emulsion. The preferred mixing apparatus includes a pump for recirculating the contents of the tank. The preferred heater includes a hot water heater and a pump for circulating the hot water through the tank.

The invention provides a simple, efficient, and economical means for disposing of waste vapors associated with polymer manufacture and processing. Specialized equipment and reagents are not necessary. Separating the organic and aqueous phases of the emulsion makes the constituents available for recycling. Thus, the total amount of waste which must be disposed of (e.g., at a toxic waste facility) is reduced. This in turn leads to reduced costs relating to the transportation and disposal of toxic waste. It also results in less toxic waste entering the environment.

Other features and advantages of the invention will be apparent from the following description of the preferred embodiments thereof, and from the claims.

DESCRIPTION OF THE PREFERRED EMBODIMENTS

We first briefly describe the drawings.

FIG. 1 is a schematic drawing of an emulsion treatment apparatus embodying the invention.

FIG. 2 is a schematic drawing of the brine addition apparatus used in the emulsion treatment apparatus shown in FIG. 1.

FIG. 3 is a schematic drawing of a hot water system for heating the mix tanks and liquid-liquid separator shown in FIG. 1.

STRUCTURE

Referring to FIG. 1, there is shown an emulsion treatment apparatus 10. Inpractice, all the components of apparatus 10 are located in a single tank cluster module to minimize electrical and water connections. All of the operations of apparatus 10 (filling tanks, adding brine solution, mixing, settling, and drain sequences) are preferably controlled automatically by a programmable logic controller ("PLC", not shown). A feed line 11 supplies emulsion from an extruder for treatment. In the case of acrylonitrile-butadiene-styrene copolymer production, the emulsion consists primarily of styrene and water.

The emulsion is fed to mix tank 16 through a fill valve 12. Mix tank 16 has a capacity of about 400 gallons. When it is full (as determined by level sensor 20), feed line 11 transports additional emulsion to mix tank 18 through fill valve 14. Mix tank 18, like mix tank 16, has a capacity of about 400 gallons. Level sensor 22 determines how much emulsion is in tank 18.

Emulsion in tanks 16 and 18 is gently recirculated through the tanks by a mix pump 24. Material exits tank 16 through valve 26 and re-enters it through valve 30. Similarly, material exits tank 18 through valve 28 and reenters through valve 32.

A saturated brine solution for breaking up the emulsion is supplied to tanks 16 and 18 through valves 30 and 32, respectively, from brine addition apparatus 51 shown in FIG. 2. Brine addition apparatus 51 consists of a brine tank 52, a brine pump 54, and brine valves 56 and 58. Brine tank 52 is a horizontal, sloped bottom tank located outside and adjacent to the tank cluster module housing emulsion treatment apparatus 10. It is capable of holding over one ton of salt. A top lid allows access to the tank for adding salt. A grate located directly under the cover (not shown) provides a platform for open bags of salt. The bottom of tank 52 is equipped with a level sensor (not shown) for maintaining the level of water in the tank and a brine removal port 57 for supplying brine to mix tanks 16 and 18. Water is added to the top of the tank. Brine pump 54 transports saturated brine solution from tank 52 to tanks 16 and 18 via brine valves 56 and 58, respectively.

As brine is added to tanks 16 and 18 from brine tank 52, mix pump 24 continues to recirculate the tank contents. When recirculation is complete, tanks 16 and 18 are allowed to settle. They are then gravity drained through drain valves 34 and 36, respectively, into liquid-liquid separator 38. Separator 38 is a U-leg separator which separates materials according to density. Thus, the more dense aqueous portion of the emulsion is removed through the bottom of separator 38 into water storage tank 40. Similarly, the less dense organic portion (containing primarily styrene) exits through the top leg into organic storage tank 42. The exact positions of the legs of separator 38 are determined by the densities of the materials in the emulsion and are set at the startup of the emulsion treatment operation.

Level sensors 44 and 46 monitor the amount of material in storage tanks 40 and 42, respectively. When the tanks are full, they are drained by means of transfer pumps 48 and 50. The contents of storage tanks 40 and 42 can then be processed further as desired. For example, the waste water can be treated and recycled for future use. Similarly, the organic materials can be treated to separate and purify styrene monomer, which is then available for future use in production acrylonitrile-butadiene-styrene production.

As the emulsion is recirculated throughout tanks 16 and 18, and then separated in separator 38, it is important to prevent it from setting up inside these components to form an intractable gel. To accomplish this, tanks 16 and 18, and separator 38, are heated using hot water supplied by hot water system 59 shown in FIG. 3. The hot water circulates through coils (not shown) in the interior of the tanks and separator. Hot water system 59 is located in the tank cluster module housing the components shown in FIG. 1 below storage tanks 40 and 42. The water is heated in water heater 62 to a temperature of about 160° F. It is then transported to tanks 16 and 18, and separator 38, by means of hot water pump 64, and transported back to water heater 62 through return line 60. A water reservoir (not shown) minimizes temperature excursions throughout the hot water system.

OPERATION

Prior to introducing emulsion into emulsion treatment apparatus 10, the apparatus is heated to a temperature of about 160° F. by turning on hot water heater 62 and hot water pump 64. Water is also added to liquid-liquid separator 38 to ensure that all ports are tight.

Once apparatus 10 has been brought up to temperature and it has been verified that all inspection ports are tight, emulsion is introduced into mix tank 16 from the extruder through feed line 11. No processing of the emulsion takes place until tank 16 is full enough to trip sensor 20. This could take approximately 24 hours. Once tank 16 is full, additional emulsion is transported to mix tank 18.

When mix tank 16 is full (as indicated by level sensor 20), processing of the emulsion begins; simultaneously, mix tank 18 continues to fill with additional emulsion. Mix pump 24 begins gently recirculating the contents of tank 16. Saturated brine solution from brine tank 52 is then added through valve 30. A brine addition timer (not shown) regulates addition of the brine solution. The rate of brine addition is not critical. The total amount of brine solution added is between 4 and 8% by volume.

Mix pump 24 continues to circulate the contents of mix tank 16 throughout brine addition. Brine addition causes the emulsion to separate. As this happens, the more dense aqueous phase sinks to the bottom of the tank. Mixing continues until all the brine solution has been added. The contents of the tanks are then allowed to settle to permit the organic and aqueous phases to separate.

At the conclusion of the settling period, the contents of tank 16 are gravity drained into liquid-liquid separator 38. Draining continues until mix tank 18 is full, at which point processing of the emulsion in tank 18 begins. The settling timer (not shown) is adjusted so that the sum of the brine addition, mix cycle, settling, and drain time is less than the time to fill one of the mix tanks. During draining, the more dense aqueous phase drains first. Separator 38 then directs it to water storage tank 40. As tank 16 is drained, the organic content of the draining material increases. Eventually the organic material overflows from separator 38 into organic storage tank 42.

Both storage tanks will automatically discharge when level sensors 44 and 46 are tripped. This activates transfer pumps 48 and 50, which act to lower the tank level. The organic and aqueous materials are then treated further as necessary.

Other embodiments are within the following claims.

I claim:

1. A method for resolving an emulsion comprising the steps of introducing an emulsion comprising an aqueous phase and an organic phase comprising components capable of polymerizing or coagulating into a tank;

heating said emulsion at a temperature sufficient to prevent said emulsion from setting up inside said tank while gently agitating said emulsion to avoid formation of hot spots;

adding a non-corrosive inorganic separation aid incapable of initiating polymerization of said emulsion or its constituents to said tank with mixing to cause said emulsion to separate into its constituent aqueous and organic phases, said separation aid comprising a saturated brine solution;

allowing the contents of said tank to settle once addition of said separation aid is complete; and removing the separated aqueous and organic phases from said tank.

2. The method of claim 1 wherein the separated aqueous and organic phases are removed by draining the contents of said tank into a heated low turbulence liquid-liquid separator.

3. The method of claim 1 wherein said tank is heated to a temperature of at least 120° F. but no greater than the boiling point of water.

4. The method of claim 3 wherein said tank is heated to a temperature of about 160° F.

5. The method of claim 1 wherein the amount of said separation aid added to said tank is between 4 and 8% by volume.

6. The method of claim 1 wherein the contents of said tank are mixed by recirculating them through the tank.

7. The method of claim 6 wherein the contents of said tank are recirculated from the bottom of the tank to the top.

8. The method of claim 1 wherein said emulsion comprises a by-product from the processing of thermoset polymers or resins.

9. The method of claim 1 wherein said emulsion comprises a by-product from the processing of thermoplastic polymers or resins.

10. The method of claim 1 wherein said emulsion comprises a by-product from the processing of acrylonitrile-butadiene-styrene processing.

11. The method of claim 1 wherein the organic phase of said emulsion comprises styrene.

12. The method of claim 1 comprising removing said aqueous and organic phases at a temperature of at least 120° F. but no greater than the boiling point of water.

13. The method of claim 12 wherein the temperature is about 160° F.

14. The method of claim 1 wherein said separation aid is added to the material recirculating through said tank during recirculation.

15. A method for resolving an emulsion comprising the steps of introducing an emulsion comprising an aqueous phase and an organic phase comprising styrene into a tank;

heating said emulsion at a temperature sufficient to prevent said emulsion from setting up inside said tank while gently agitating said emulsion to avoid formation of hot spots;

adding a saturated brine solution to said tank with mixing to separate said aqueous and organic phases;

allowing the contents of said tank to settle once brine addition is complete; and draining the contents of said tank into a heated low turbulence liquid-liquid separator to remove the separated aqueous and organic phases.

* * * * *